N. BELLEVILLE.
SPIRIT LEVEL AND GLASS.
APPLICATION FILED JAN. 18, 1918.
1,323,148.
Patented Nov. 25, 1919.
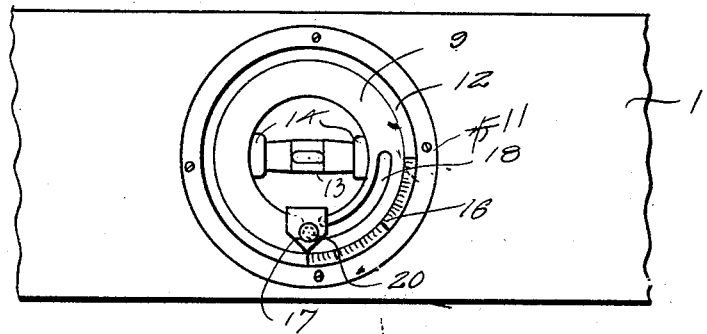
Fig. 1.
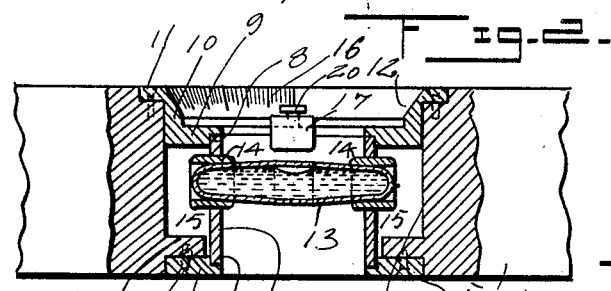
Fig. 2.
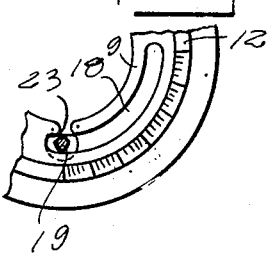
Fig. 4.
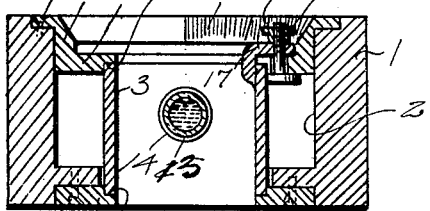
Fig. 3.
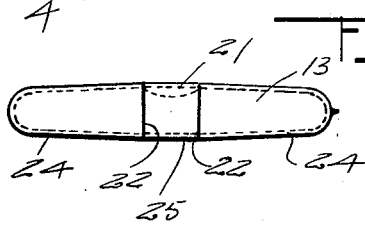
Fig. 5.
Inventor
N. Belleville
Witnesses

UNITED STATES PATENT OFFICE.

NAPOLEON BELLEVILLE, OF LEWISTON, MAINE.

SPIRIT-LEVEL AND GLASS.

1,323,148.   Specification of Letters Patent.   Patented Nov. 25, 1919.

Application filed January 18, 1918. Serial No. 212,468.

*To all whom it may concern:*

Be it known that I, NAPOLEON BELLEVILLE, a citizen of the United States, residing at Lewiston, in the county of Androscoggin and State of Maine, have invented certain new and useful Improvements in Spirit-Levels and Glasses; and I do hereby declare the following to be a full, clear, and exact description of the invention, such as will enable others skilled in the art to which it appertains to make and use the same.

This invention relates to spirit levels and has for one of its objects to provide an improved level in which the glass is so formed that the bubble can be readily seen regardless of the angle in which the level is held.

A further object of the invention is the provision of an improved level in which the pitch or inclination of the surface on which the level is being used can be readily seen.

A still further object of the invention is the provision of a level having a rotatable collar carrying the level glass, the collar carrying an indicator arm for coöperating with a protractor course or graduated scale formed on the level and means carried by the collar for holding the same in adjusted position in relation to the protractor.

A still further object of the invention is the provision of a device of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed, and illustrated in the accompanying drawing, forming a part thereof, in which:—

Figure 1 is a fragmentary side elevation of the improved spirit level.

Fig. 2 is a horizontal vertical section taken through the improved level.

Fig. 3 is a central transverse section taken through the improved level.

Fig. 4 is a fragmentary side elevation of the level showing the graduated scale, and Fig. 5 is a detail view showing the improved spirit level glass.

Referring to the drawing in detail, wherein similar reference numerals designate corresponding parts throughout the several views, the numeral 1 generally indicates the stock which may be of any size or shape, and formed from any desired material and the same is provided with a central transverse circular opening 2, in which is fitted the rotatable sleeve 3. The sleeve 3 is held in position by means of an annular ring 4, which is held in position by means of fastening elements 5, which extend through the ring and an inwardly extending annular rib 6 formed on the inner surface of the circular opening 2. The outer edge of the ring 4 is provided with an annular recess 7, in which the sleeve 3 is fitted. The outer edge of the sleeve 3 is received in a similar annular recess 8 formed in the inwardly projecting flange 9 formed on the collar 10 which is held in position by means of detachable fastening elements 11. The collar 10 is provided with a downwardly beveled surface 12 which extends toward the inwardly extending flange 9. The improved spirit glass 13, which will hereinafter be more fully described, is detachably held in position by means of collars 14 which are detachably fitted in diametrically opposed recesses 15 formed in the sleeve 3. The beveled surface 12 is provided with graduations 16 and coöperating with the graduations 16 is a pointer 17 abutting the outer lower edge of the sleeve 3. The inwardly extending flange 9 is provided with an arcuate slot 18 through which protrudes the set screw 19 carrying an adjusting nut 20 by means of which the pointer is held in any adjusted position. By this construction it can be seen that when the stock 1 is placed on a surface, the adjusting nut can be grasped as a thumb piece and the sleeve rotated until the bubble 21 appears between the marks 22 which extend entirely around the glass and then the nut 20 can be tightened and the pointer will be held in its adjusted position and the angle of inclination can be readily seen. The inner edge of the flange 9 is provided with an inwardly extending notch 23 which opens into the arcuate slot 18 and this notch forms means whereby the thumb screw can be taken out of the slot 18 when the sleeve 3 is removed from the stock 1.

The improved spirit glass 13 has its ends gradually tapered outwardly as at 24 from the central portion 25 which is defined by the marks 22 which extend entirely around the glass. The tapered outer ends 24 of the glass 13 engage the collars 14 and the same are wedged in position between the collars. The annular marks 22 define the space between which the bubble 21 lies when the surface upon which the level is used is absolutely horizontal.

The spirit level glass as shown provides means whereby the bubble 21 can be readily seen no matter at what angle the stock is positioned.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What I claim as new is:—

In a spirit level, a stock having an opening therein, a collar secured to each of the terminals of the walls of the opening, the inner surface of the collars having annular recesses formed therein, a sleeve supported between the collars and rotatably adjustable in the recesses, a level tube carried by said sleeve, one of said collars having a plurality of graduations marked thereon, a pointer arranged for coöperation with said graduations, and having an inner bent end engaging the collar, and means carried by the pointer for engaging one of said collars to hold the sleeve in any adjusted position, as and for the purpose specified.

In testimony whereof I affix my signature in presence of two witnesses.

NAPOLEON BELLEVILLE.

Witnesses:
 ARTHUR FANQUETTE,
 B. L. BENNMAN.